US009494794B2

(12) United States Patent
El-Ghoroury et al.

(10) Patent No.: US 9,494,794 B2
(45) Date of Patent: Nov. 15, 2016

(54) SPLIT EXIT PUPIL HEADS-UP DISPLAY SYSTEMS AND METHODS

(71) Applicant: Ostendo Technologies, Inc., Carlsbad, CA (US)

(72) Inventors: Hussein S. El-Ghoroury, Carlsbad, CA (US); Jingbo Cai, Carlsbad, CA (US); Chih-Li Chuang, San Diego, CA (US); Marty Maiers, Fallbrook, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 86 days.

(21) Appl. No.: 14/580,009

(22) Filed: Dec. 22, 2014

(65) Prior Publication Data

US 2016/0062113 A1  Mar. 3, 2016

Related U.S. Application Data

(60) Provisional application No. 62/044,831, filed on Sep. 2, 2014.

(51) Int. Cl.
*G02B 27/01* (2006.01)
*G09G 3/20* (2006.01)
(Continued)

(52) U.S. Cl.
CPC ....... *G02B 27/0101* (2013.01); *G02B 27/0081* (2013.01); *G02B 27/1066* (2013.01);
(Continued)

(58) Field of Classification Search
CPC .......... G02B 27/0101; G02B 27/0081; G02B 27/1066; G02B 2027/0125; G02B 2027/014; G02B 2027/0112; G02B 2027/011; G02B 2027/0123; G02B 2027/0147; G06T 3/0012; G06T 3/0093; G09G 3/2003; G09G 3/3406; G09G 2360/14
See application file for complete search history.

(56) References Cited

U.S. PATENT DOCUMENTS 4,218,111 A  8/1980 Withrington et al.
4,613,200 A  9/1986 Hartman
(Continued)

FOREIGN PATENT DOCUMENTS

DE  102012205164  10/2013
EP  2515157  10/2012
(Continued)

OTHER PUBLICATIONS

"International Search Report and Written Opinion of the International Searching Authority Dated Dec. 16, 2015; International Application No. PCT/U52015/047942", (Dec. 16, 2015).
(Continued)

*Primary Examiner* — Todd Buttram
(74) *Attorney, Agent, or Firm* — Blakely Sokoloff Taylor & Zafman LLP

(57) ABSTRACT

Split exit pupil (or split eye-box) heads-up display (HUD) systems and methods are described. The described HUD system methods make use of a split exit pupil design method that enables a modular HUD system and allows the HUD system viewing eye-box size to be tailored while reducing the overall HUD volumetric aspects. A HUD module utilizes a high brightness small size micro-pixel imager to generate a HUD virtual image with a given viewing eye-box segment size. When integrated together into a HUD system, a multiplicity of such HUD modules displaying the same image would enable such an integrated HUD system to have an eye-box size that is substantially larger than the eye-box size of a HUD module. The resultant integrated HUD system volume is substantially volumetrically smaller than a HUD system that uses a single larger imager. Furthermore, the integrated HUD system can be comprised of a multiplicity of HUD modules to scale the eye-box size to match the intended application while maintaining a given desired overall HUD system brightness.

43 Claims, 10 Drawing Sheets

(51) Int. Cl.
*G09G 3/34* (2006.01)
*G06T 3/00* (2006.01)
*G02B 27/00* (2006.01)
*G02B 27/10* (2006.01)

(52) U.S. Cl.
CPC .......... *G06T3/0012* (2013.01); *G06T 3/0093* (2013.01); *G09G 3/2003* (2013.01); *G09G 3/3406* (2013.01); *G02B 2027/011* (2013.01); *G02B 2027/014* (2013.01); *G02B 2027/0112* (2013.01); *G02B 2027/0123* (2013.01); *G02B 2027/0125* (2013.01); *G02B 2027/0147* (2013.01); *G09G 2360/14* (2013.01)

(56) References Cited

U.S. PATENT DOCUMENTS

| | | |
|---|---|---|
| 5,729,366 A | 3/1998 | Yang |
| 6,813,086 B2 | 11/2004 | Bignolles et al. |
| 7,391,574 B2 | 6/2008 | Fredriksson |
| 7,623,560 B2 | 11/2009 | El-Ghoroury et al. |
| 7,767,479 B2 | 8/2010 | El-Ghoroury et al. |
| 7,829,902 B2 | 11/2010 | El-Ghoroury et al. |
| 7,982,959 B1 | 7/2011 | Lvovskiy et al. |
| 8,049,231 B2 | 11/2011 | El-Ghoroury et al. |
| 8,243,770 B2 | 8/2012 | El-Ghoroury et al. |
| 8,553,334 B2 | 10/2013 | Lambert et al. |
| 8,567,960 B2 | 10/2013 | El-Ghoroury et al. |
| 8,629,903 B2 | 1/2014 | Seder et al. |
| 2009/0086170 A1 | 4/2009 | El-Ghoroury et al. |
| 2009/0278765 A1* | 11/2009 | Stringfellow .......... G02B 27/01 345/7 |
| 2009/0278998 A1 | 11/2009 | El-Ghoroury et al. |
| 2010/0003777 A1 | 1/2010 | El-Ghoroury et al. |
| 2010/0066921 A1 | 3/2010 | El-Ghoroury et al. |
| 2010/0220042 A1 | 9/2010 | El-Ghoroury et al. |
| 2012/0033113 A1 | 2/2012 | El-Ghoroury et al. |
| 2013/0016292 A1* | 1/2013 | Miao .................... G02B 27/283 349/11 |
| 2013/0182197 A1* | 7/2013 | Ludewig ............ G02B 27/0101 349/11 |
| 2014/0055863 A1 | 2/2014 | Inoguchi |
| 2015/0085259 A1 | 3/2015 | Schreiber et al. |
| 2016/0085084 A1* | 3/2016 | Masson ................ G02B 5/0215 359/633 |

FOREIGN PATENT DOCUMENTS

| | | |
|---|---|---|
| EP | 2565700 | 3/2013 |
| JP | 08-122737 | 5/1996 |
| WO | WO-2011/065738 | 6/2011 |

OTHER PUBLICATIONS

Born, Max, et al., "Principles of Optics, 7th Edition", Cambridge University Press, (1999), pp. 236-244.

Guilloux, Cyril, et al., "Varilux S series, breaking the limits", (Jun. 2012), pp. 1-9.

Walker, Bruce H., "Optical Design for Visual Systems", Published by SPIE—The International Society for Optical Engineering, (2000), pp. 139-150.

* cited by examiner

SPLIT EXIT PUPIL HEADS-UP DISPLAY SYSTEMS AND METHODS

CROSS-REFERENCE TO RELATED APPLICATIONS

This application claims the benefit of U.S. Provisional Patent Application No. 62/044,831 filed Sep. 2, 2014.

BACKGROUND OF THE INVENTION

1. Field of the Invention

This invention relates generally to heads-up displays (HUD) and, more particularly to HUD systems that generates a virtual image.

2. Prior Art

References Cited:

[1] U.S. Pat. No. 7,623,560, El-Ghoroury et al, Quantum Photonic Imager and Methods of Fabrication Thereof, Nov. 24, 2009.
[2] U.S. Pat. No. 7,767,479, El-Ghoroury et al, Quantum Photonic Imager and Methods of Fabrication Thereof,
[3] U.S. Pat. No. 7,829,902, El-Ghoroury et al, Quantum Photonic Imager and Methods of Fabrication Thereof,
[4] U.S. Pat. No. 8,049,231, El-Ghoroury et al, Quantum Photonic Imager and Methods of Fabrication Thereof,
[5] U.S. Pat. No. 8,243,770, El-Ghoroury et al, Quantum Photonic Imager and Methods of Fabrication Thereof,
[6] U.S. Patent Application Publication No. 2010/0066921, El-Ghoroury et al, Quantum Photonic Imager and Methods of Fabrication Thereof,
[7] U.S. Patent Application Publication No. 2012/0033113, El-Ghoroury et al, Quantum Photonic Imager and Methods of Fabrication Thereof,
[8] U.S. Pat. No. 4,218,111, Withrington eta al, Holographic Heads-up Displays, Aug. 19, 1980.
[9] U.S. Pat. No. 6,813,086, Bignolles et al, Head Up Display Adaptable to Given Type of Equipment, Nov. 2, 2004.
[10] U.S. Pat. No. 7,391,574, Fredriksson, Heads-up Display, Jun. 24, 2008.
[11] U.S. Pat. No. 7,982,959, Lvovskiy et al, Heads-up Display, Jul. 19, 2011.
[12] U.S. Pat. No. 4,613,200, Hartman, Heads-Up Display System with Holographic Dispersion Correcting, Sep. 23, 1986.
[13] U.S. Pat. No. 5,729,366, Yang, Heads-Up Display for Vehicle Using Holographic Optical Elements, Mar. 17, 1998.
[14] U.S. Pat. No. 8,553,334, Lambert et al, Heads-Up Display System Utilizing Controlled Reflection from Dashboard Surface, Oct. 8, 2013.
[15] U.S. Pat. No. 8,629,903, Seder et al, Enhanced Vision System Full-Windshield HUD, Jan. 14, 2014.
[16] B. H. Walker, Optical Design of Visual Systems, Tutorial tests in optical engineering, published by The international Society of Optical Engineering (SPIE), pp. 139-150, ISBN 0-8194-3886-3, 2000.
[17] C. Guilloux et al, Varilux S Series Braking the Limits
[18] M. Born, Principles of Optics, 7th Edition, Cambridge University Press 1999, Section 5.3, pp. 236-244.

Heads-up displays are being sought after as a visual aide technology that can contribute to automotive safety by making automobile drivers more visually aware and informed of the automobile dashboard information without taking their sight and attention off the road. However, currently available heads-up displays are volumetrically large and too expensive to be a viable option for use in automobiles. The same types of difficulties, though to a lesser extent in the cost factor, are encountered in applications of heads-up displays in small aircraft and helicopters. In the case of heads-up display automotive applications, the volumetric and cost constraints are further exacerbated by the wide range of vehicle sizes, types and price range. Therefore there is a need for low-cost and non-bulky heads-up displays that would be suitable for use in small vehicles such as automobiles, small aircraft and helicopters.

Prior art HUD systems can be grouped into two types; pupil imaging HUD and non-pupil imaging HUD. Pupil imaging HUD are typically comprised of a relay module, which is responsible for intermediate image delivery and pupil formation, and a collimation module, which is responsible for image collimation and pupil imaging at the viewer's eye location (herein referred to as the eye-box). The collimation module of a pupil imaging HUD is typically realized as a tilted curved or planar reflector or a holographic optical element (HOE) and the relay module is typically tilted for bending the light path and to compensate for optical aberrations. Non-pupil imaging HUD defines the system aperture by the light cone angle at the display or at the intermediate image location by diffusion. For intermediate image HUD systems, a relay module is also needed, but HUD aperture is decided by collimation optics alone. The collimation optics usually has axial symmetry but with folding mirrors to meet the volumetric constraints. This is decided by aberration correction needs and system volumetric aspects.

The prior art described in Ref [8], shown in FIG. 1-1, uses a concave HOE reflector (11 in FIG. 1-1) as a combiner and collimator to minimize collimation optics and reduce the HUD system volumetric aspect. The resultant HUD system needs complicated tilted relay optics (10 in FIG. 1-1) to compensate aberration and deliver an intermediate image. In addition, this HUD system works only for a narrow spectrum.

The prior art described in Ref [9], shown in FIG. 1-2, uses a relay optics (REL) module to deliver an intermediate image at the focal plane of convergent combiner (CMB) mirror (CMB in FIG. 1-2) and defines the system pupil. The CMB mirror collimates the intermediate image and images the system pupil onto the viewer's eye to facilitate viewing. This pupil imaging HUD approach always involves a complicated REL module for packaging and aberration compensation.

The prior art described in Ref [10], shown in FIG. 1-3, uses a projection lens (3) to project an intermediate image on a diffusive surface (51 in FIG. 1-3) as an image source and a semi-transparent collimating mirror (7 in FIG. 1-3). The collimating mirror forms an image at infinity and the aperture of the collimation optics is defined by the angular width of the diffuser.

The prior art described in Ref [11], shown in FIG. 1-4, uses an image forming source comprised of two liquid crystal display (LCD) panels (23 in FIG. 1-4) to form an intermediate image on a diffusive screen (5 in FIG. 1-4) which is placed at the focal plane of the collimation optics module (1 in FIG. 1-4). The main purpose of the two LCD panels in the image forming source is to achieve sufficient brightness for viewability of the formed image. In order to achieve that objective the two LCD panels in the image forming source are configured to either form two contiguous side by side images at the diffusive screen or overlap two images shifted from each other horizontally and vertically by a half pixel at the diffusive screen.

The prior art described in Ref [12] uses a pair of reflective holographic optical elements (HOE) to achieve holographic dispersion correction and to project a virtual image of a broadband display source within the observer's field of view. The prior art described in Ref [13] also uses a pair of holographic optical elements (HOE); one transmissive and another that is reflective to project an image onto the vehicle windshield.

The prior art described in Ref [14], shown in FIG. 1-5, uses an image projector (14 in FIG. 1-5) mounted on the topside of the vehicle windshield configured to project an image onto the vehicle dashboard equipped with a faceted reflective surface (18 in FIG. 1-5) with the latter being configured to reflect the image from the image projector onto the windshield of the vehicle. The vehicle windshield surface is oriented to reflect the image from the dashboard faceted reflective surface toward the viewer.

Common amongst the briefly described prior art HUD systems as well as the many others described in the cited prior art is the high cost and large volumetric size of the system. In addition, none of the found prior art HUD systems can be scaled in size and cost to match a wide range of automobiles and other vehicles' sizes and price ranges. It is therefore an objective of this invention to introduce heads-up display methods that use a multiplicity of emissive micro-scale pixel array imagers to realize a HUD system that is substantially smaller in volume than a HUD system that uses a single image forming source. It is further the objective of this invention to introduce a novel split exit pupil HUD system design method that utilizes the multiplicity of emissive micro-scale pixel array imagers to enable the realization of a modular HUD system with volumetric and cost aspects that can be scaled to match a wide range automobile and small vehicle sizes and price ranges. Additional objectives and advantages of this invention will become apparent from the following detailed description of preferred embodiments thereof that proceeds with reference to the accompanying drawings.

BRIEF DESCRIPTION OF THE DRAWINGS

In the following description, like drawing reference numerals are used for the like elements, even in different drawings. The matters defined in the description, such as detailed construction and design elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of it will now be described, by way of non-limiting example only, with reference to accompanying drawings, in which:

FIG. 1-2 illustrates prior art Heads-up Display (HUD) systems that use a relay optics (REL) module to deliver an intermediate image at the focal plane of convergent combiner (CMB) mirror and defines the system pupil.

FIG. 1-3 illustrates prior art Heads-up Display (HUD) systems that use a projection lens (3) to project an intermediate image on a diffusive surface as an image source and a semi-transparent collimating mirror.

FIG. 1-4 illustrates prior art Heads-up Display (HUD) systems that use an image forming source comprised of two liquid crystal display (LCD) panels to form an intermediate image on a diffusive screen which is placed at the focal plane of the collimation optics module.

FIG. 1-5 illustrates prior art Heads-up Display (HUD) systems that use an image projector mounted on the topside of the vehicle windshield configured to project an image onto the vehicle dashboard equipped with a faceted reflective surface with the latter being configured to reflect the image from the image projector onto the windshield of the vehicle.

FIG. 2 illustrates an exemplary modular HUD (MHUD) system of this invention.

FIG. 3 illustrates the relationships among design parameters and constraints of the MHUD system of FIG. 2.

FIG. 4 illustrates the optical design aspects and ray trace diagram of the HUD module comprising the MHUD assembly of the embodiment of FIG. 2.

FIG. 5 illustrates the optical performance of the HUD module comprising the MHUD assembly of the embodiment of FIG. 2.

DETAILED DESCRIPTION OF THE PREFERRED EMBODIMENTS

Figure 1:
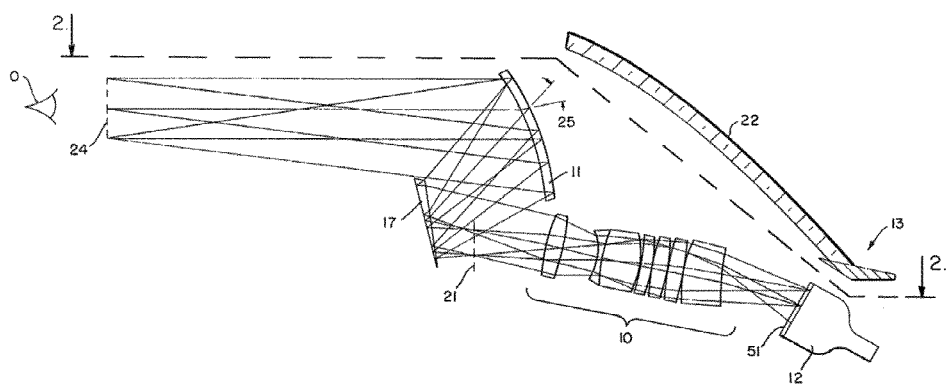
FIG. 1-1 Illustrates prior art Heads-up Display (HUD) systems that use a concave HOE reflector as a combiner and collimator to minimize collimation optics and reduce the HUD system volumetric aspect.

References in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

A new class of emissive micro-scale pixel array imager devices has been recently introduced. These devices feature high brightness, very fast multi-color light intensity and spatial modulation capabilities in a very small single device size that includes all required image processing drive circuitry. The solid state light (SSL) emitting pixels of one such device may be either a light emitting diode (LED) or laser diode (LD) whose on-off state is controlled by the drive circuitry contained within a CMOS chip (or device) upon which the emissive micro-scale pixel array of the imager is bonded. The size of the pixels comprising the emissive array of such imager devices would typically be in the range of approximately 5-20 microns with the typical emissive surface area of the device being in the range of approximately 15-150 square millimeters. The pixels within the emissive micro-scale pixel array device are individually addressable spatially, chromatically and temporally, typically through the drive circuitry of its CMOS chip. The brightness of the light generate by such imager devices can reach multiple 100,000 cd/m2 at reasonably low power consumption. One example of such devices are the QPI imagers (see Ref. [1-7]), referred to in the exemplary embodiments described below. However it is to be understood that the QPI imagers are merely an example of the types of devices that may be used in the present invention. (QPI is a trade mark of Ostendo Technologies, Inc.) Thus in the description to follow, any references to a QPI imager is to be understood to be for purposes of specificity in the embodiments disclosed as one specific example of a solid state emissive pixel array imager that may be used, and not for the purpose of any limitation of the invention.

The present invention combines the emissive micro pixel array device unique capabilities of such imagers with a novel split exit pupil HUD system architecture in order to realize a low-cost and small volume modular HUD (MHUD) system that can be readily used in applications where the cost and volumetric constraints are paramount, such as for example an automotive HUD. The combination of the emissive high brightness micro emitter pixel array of imagers such as the QPI imagers and the split exit pupil HUD architecture of this invention can enable HUD systems that operate effectively in the high brightness ambient sunlight yet are volumetrically small enough to fit behind the dashboard or instrument panel of a wide range of vehicle sizes and types. (The word vehicle as used herein is used in the most general sense, and includes any means in or by which someone travels, including but not necessarily limited to travel on land, water, underwater and through the air. The low cost and modularity of the split exit pupil HUD architecture enabled by the such imagers enables a modular HUD system that can be tailored to fit the volumetric constraints of a wide range of vehicles. The virtues of the split exit pupil HUD system will become more apparent from the detailed description provided herein within the context of the embodiments described in the following paragraphs.

Figures 1, 2:
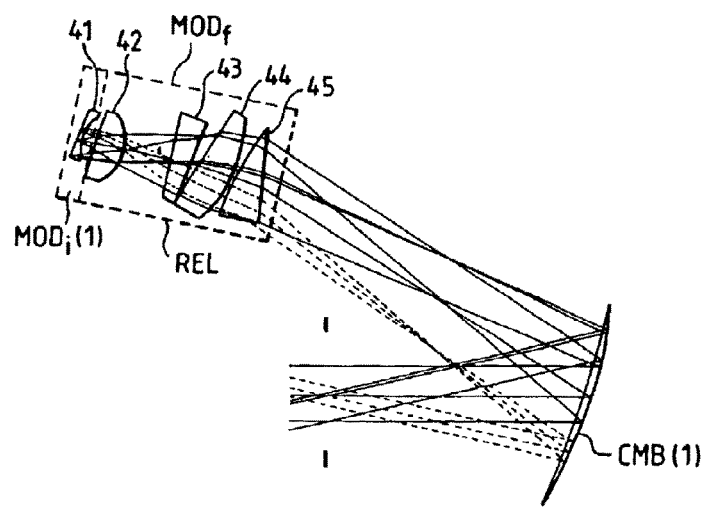

FIG. 2 illustrates the design concept of the modular HUD (MHUD) system 200 of one embodiment of this invention. As illustrated in FIG. 2, in the preferred embodiment, the MHUD system 200 of the invention is comprised of the MHUD assembly 210 which in turn is comprised of multiplicity of the modules 215 assembled together to form the MHUD 210 whereby each module 215 is comprised of a single imager (such as a QPI imager) with associated optics 220 and a concave mirror 230. As illustrated in FIG. 2, the image emitted from each single imager with associated optics 220 is collimated, magnified and reflected by its associated concave mirror 230, then partially reflected off the vehicle windshield 240 to form the virtual image 260 which is viewable within the eye-box segment 255 located at the nominal head position of the vehicle's driver (operator). As illustrated in FIG. 2, each of the modules 215 of the MHUD assembly 210 is disposed to form the same virtual image 260 at any one time and at the same location from the vehicle windshield 240, but each at its corresponding eye-box segment 255, such that the multiplicity of modules 215 of the MHUD assembly 210 collectively form the collective eye-box 250 of the MHUD system 200. That is to say, the virtual image 260 could be partially viewable from each of the eye-box segments 255 but fully viewable in the collective eye-box 250. Accordingly, the overall size of the MHUD system 200 eye-box segment 255 can be tailored by selecting the appropriate number of the modules 215 comprising the MHUD assembly 210. While each of the modules 215 of the MHUD assembly 210 is disposed to form the same virtual image 260 at any one time, those images of course will change with time, and may change slowly, as will for example a fuel gauge image, or may change more rapidly, such as in the display of a GPS navigation system display image, though the MHUD system 200 of the present invention may operate at frequencies at least up to a typical video rate if the image data is available at such a rate.

In the preferred embodiment of the MHUD system 200 the eye-box segments 255 of the modules 215 of the MHUD assembly 210 are each located at the exit pupil of the light ray bundle reflected by their corresponding concave mirror 230. The collective eye-box 250 of the MHUD system 200 is in effect a split exit pupil eye-box that is formed by the overlap of the eye-box segments 255 of the modules 215 of the MHUD assembly 210. This split exit pupil design method of the MHUD system 200 of this invention is further explained in more detail in the following paragraphs.

In the preferred embodiment the MHUD system 200 of this invention, the MHUD assembly 210 is comprised of a multiplicity of the modules 215 assembled together to form the MHUD assembly 210 whereby each module 215 is comprised of a QPI imager with associated optics 220 and a concave mirror 230. The design method of the MHUD assembly 210 of the MHUD system 200 of this embodiment of the invention and its respective modules 215 are described in more detail in the following paragraph preceded by an explanation of the pertinent advantages and related design parameters tradeoff of the MHUD system 200 of this invention.

MHUD System 200 Optical Design Parameters Tradeoffs—

In order to appreciate the advantages of the MHUD system 200 of this invention, it is deemed important to explain the underlying design tradeoffs of typical HUD systems and the relationships between its pertinent design parameters. The image generated by a HUD system is typically superimposed on the natural scene to make the viewer operating the vehicle be visually aware of the vehicle operating parameters and to also provide critical information, such as navigation for example, without requiring the driver to take their sight and attention away from the road or the external surroundings of the vehicle. The important parameters to consider in the design of a HUD system include; the target size of the collective eye-box, the desired field of view (FOV), the formed image size, the image resolution and the system volumetric constraints. The relationships among these design parameters and constraints are illustrated in FIG. 3.

How the Modular HUD (MHUD) of this Invention Realizes a Reduced Volume—

Figures 1, 2, 3:
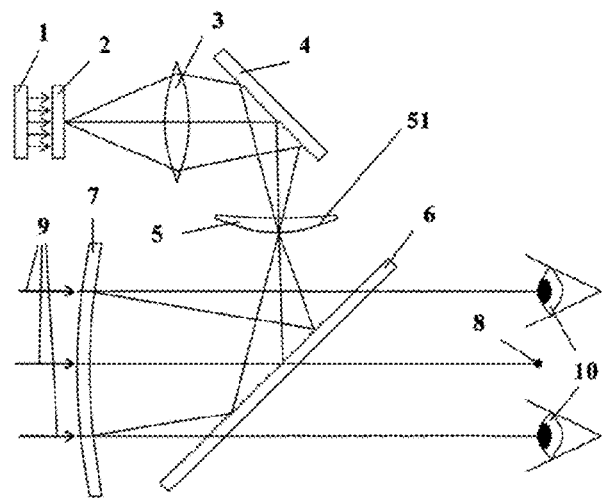

Referring to FIG. 3, a reduction of MHUD system 200 imager 220 size would lead to a smaller effective focal length (EFL), which is the characteristic optical track length of the system and generally contributes to the reduction of system volume. However, if the eye-box size is maintained, the reduction of imager aperture size will lead to a lower system F/# accompanied by an increase of optical complexity. This generally results in larger system volume. In reference to the MHUD system 200 design concept illustrated in FIG. 2, the size of the eye-box segment 255 for each module 215 is scaled along with the imager 220 size to avoid the increase of optical complexity. This leads to the scaling of the volume of each of the modules 215 by the imager 220 size ratio. A multiplicity of modules 215 would be combined to form a MHUD assembly 210 that can provide an arbitrary sized collective eye-box 250. This novel multi segments eye-box design concept of the MHUD system 200 of this invention is realized by splitting the exit pupil of the system formed at the viewer's eye-box into multiple segments, each corresponding with one of the eye-box segments 255 comprising the collective eye-box 250 of the MHUD system 200 of this invention. This split exit pupil design method of the MHUD system 200 of this invention would achieve smaller overall volumetric aspects than a prior art HUD system providing the same size eye-box. This would lead to a reduction in the overall HUD volume, complexity and cost. Other advantages of split exit pupil design method of the MHUD system 200 of this invention are described in the following discussion. Of course, each module is emitting the same image at any one time, so a vehicle operator will see the same virtual image at the same position, independent of which eye-box segment 255 or eye-box segments 255 the operator views.

The primary contributor to the volume of prior art HUD systems that uses a mirror reflector Ref [8-10] has been identified as the concave mirror. Besides the large size of the mirror itself, the size of the image source would also be proportionally large, which dictates the use of either a large size imager, such as an LCD panel, or forming a large size intermediate image that is projected on a diffusive screen, which adds even more volume for incorporating the projector imager and its associated projection optics. As explained in the foregoing discussion, the MHUD system 200 of this invention achieves substantially smaller volumetric aspects than prior art HUD systems that use a single concave mirror as the main reflector by using the MHUD assembly 210 that is comprised of the multiple modules 215 each using a smaller size concave mirror 230 that are assembled together to form the overall reflector 235 of the MHUD assembly 210, which is much smaller in size and achieves a much smaller optical track length. The MHUD assembly 210 using the smaller aperture size imagers 220 enables the use of smaller aperture size concave mirrors 230 with smaller optical track length which result in the substantially smaller volume and volumetrically efficient MHUD system 200 of this invention.

Figures 1, 2, 3, 4:
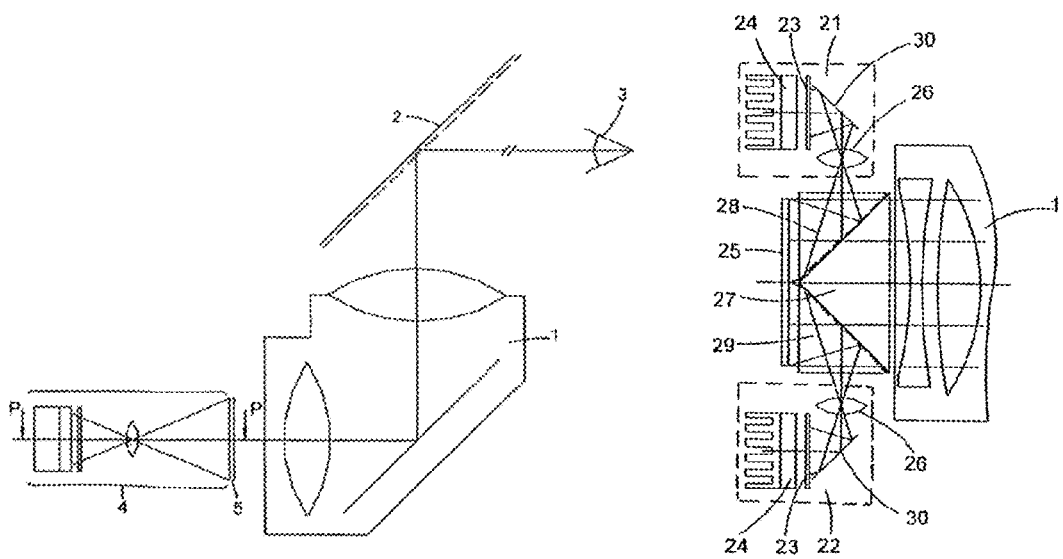

The design of the MHUD system 200 of this invention works by dividing the large collimated beam that would typically be generated by the single large mirror into three equally sized collimated sub-beams. Each sub-beam would be generated by the optical sub-system of the module 215. As a result the F#, optical complexity and focal length (EFL) (or optical track length) is reduced and consequently the physical volumetric envelope of the system is reduced. FIG. 4 illustrates the optical design aspects and ray trace diagram of the module 215 comprising the MHUD assembly 210. As illustrated in FIG. 4 the module 215 of a preferred embodiment is comprised of one QPI imager together with its associated optics 220 and the concave mirror 230. Although in the embodiment illustrated in FIG. 4 the optics 420 associated with the QPI imager 410 is shown as a separate lens optical element, in an alternate embodiment of this invention the QPI imager associated optics 420 would be attached directly on top of the emissive surface of the QPI imager 410 to form the QPI imager assembly 220. As illustrated in FIG. 4, in each of the modules 215 the reflective concave mirror 230 magnifies and collimates the image generated by its corresponding QPI imager (or other imager) 220 to form one eye-box segment 255 of collective eye-box 250, while the optical element 420 associated with the QPI imager 410 in FIG. 4 balances the off-axis distortion and tilting aberrations arising from the reflective concave mirrors 230.

Figures 1, 2, 3, 4, 5:
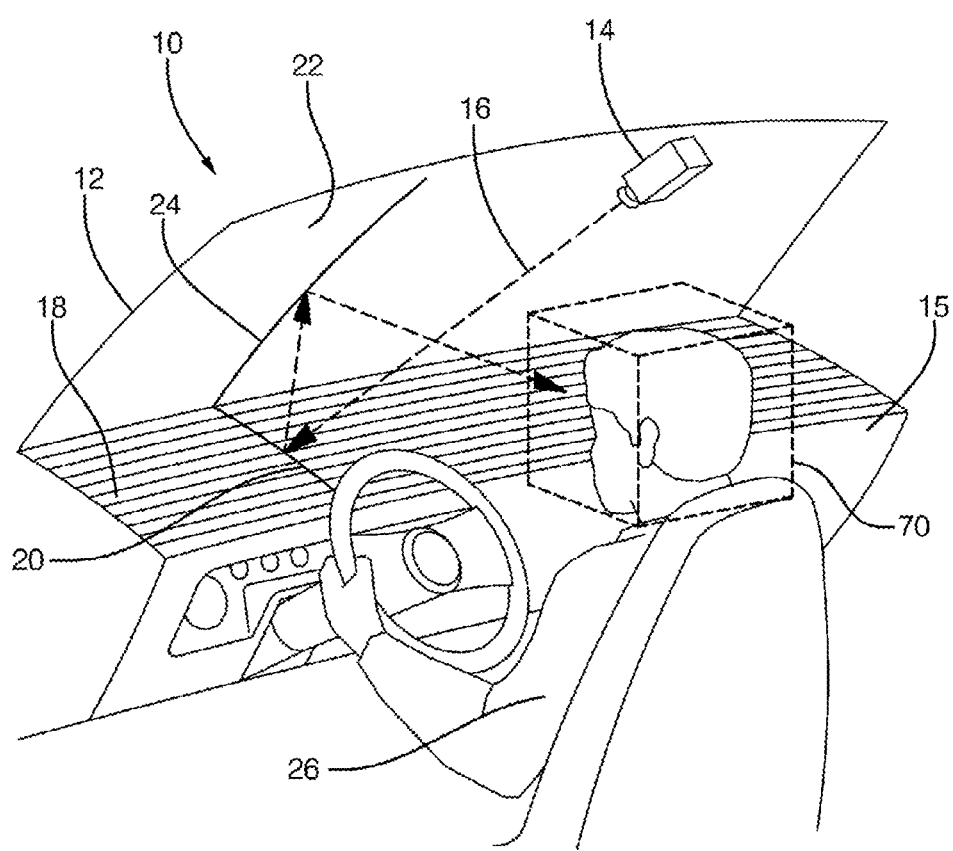
Figure 2:
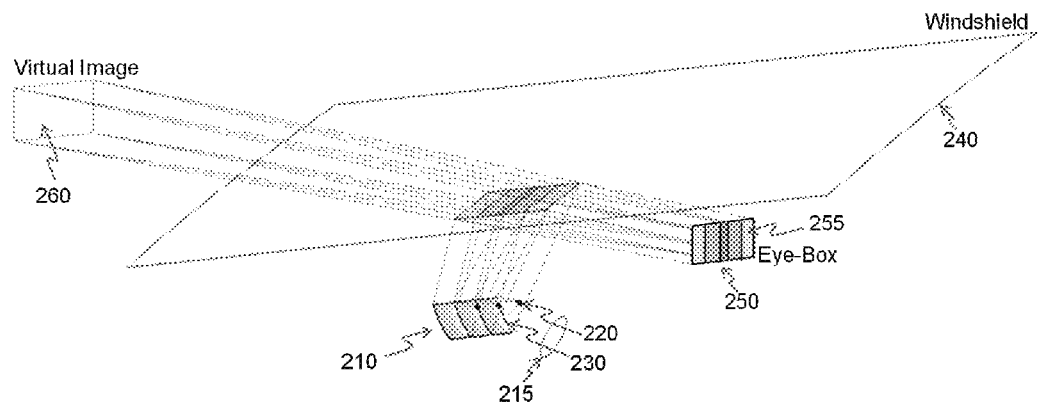
Figure 3:
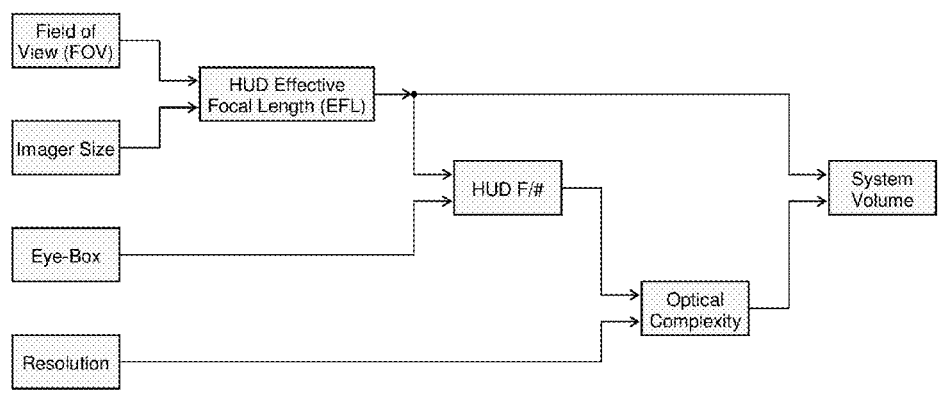
Figure 4:
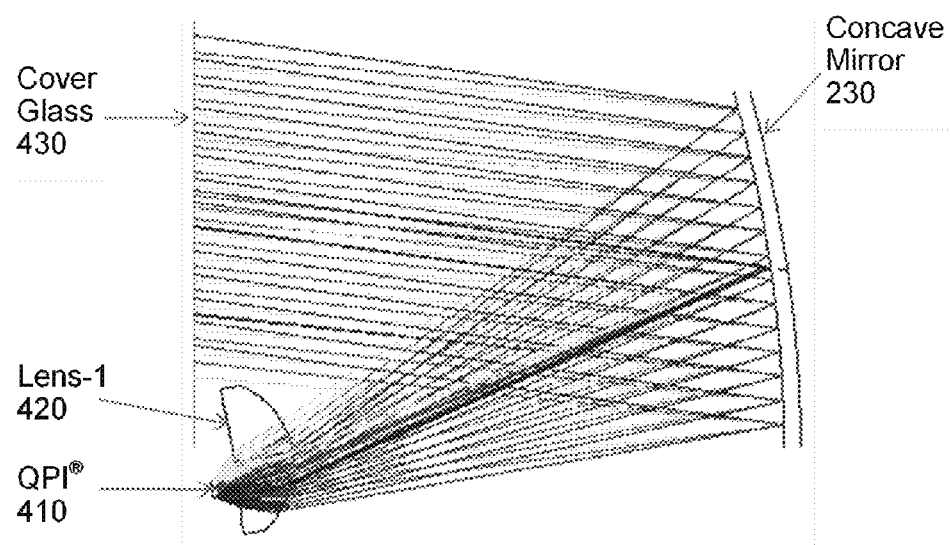
Figure 5:
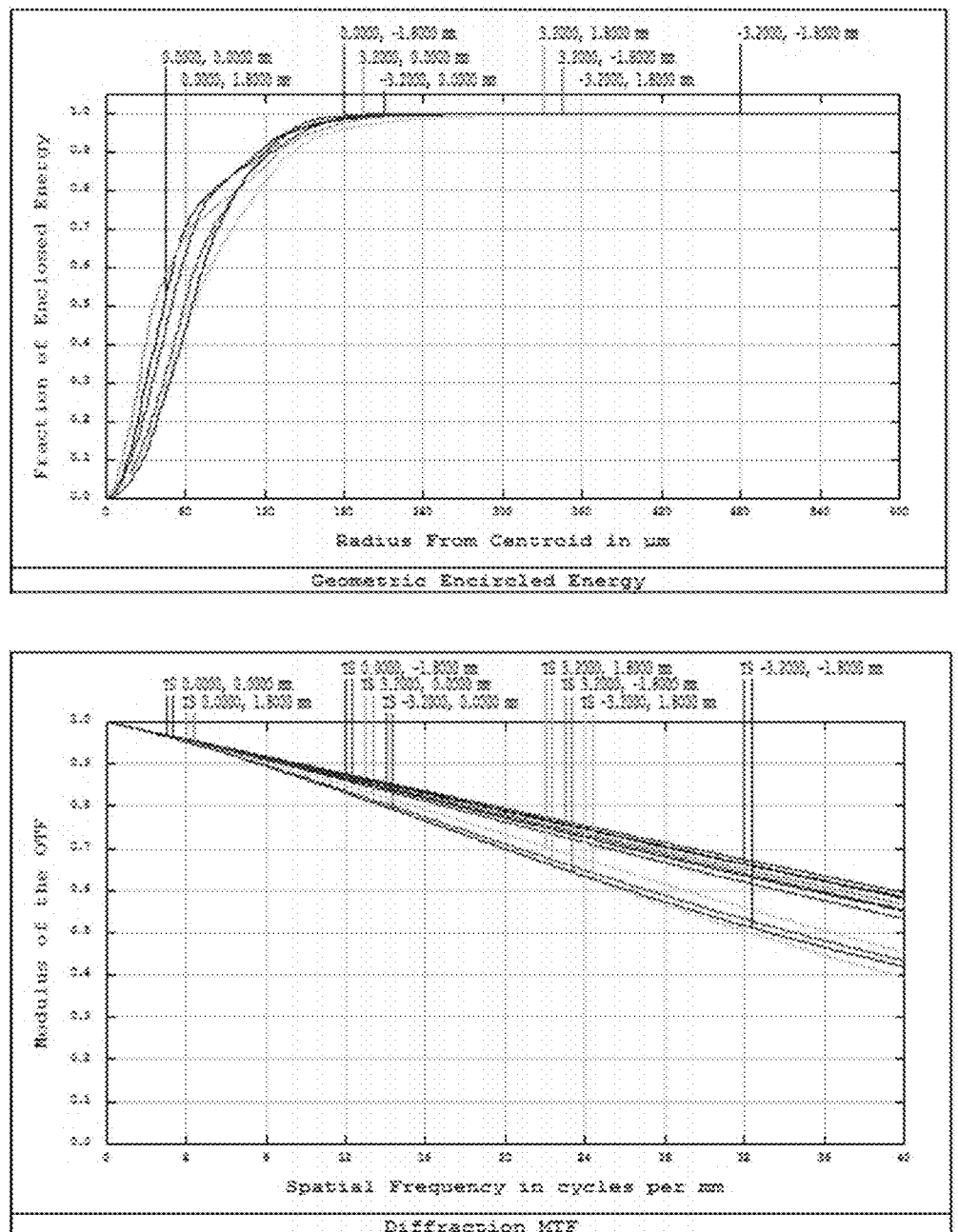

FIG. 5 illustrates the optical performance of the module 215 of the MHUD assembly 210. As illustrated in FIG. 5, the role of the optical element 420 associated with the QPI device 410 is to balance the off-axis distortion and tilting aberrations arising from the reflective concave mirrors 230 in order to minimize the image swimming effect while maintaining the modulation transfer function (MTF) sufficiently high. For the purpose of completeness, the image swimming effect is typically caused by variations in the direction of the light entering the viewer's pupil due to the optical distortion caused by the mirror aberrations and would result in a perceived false motion of the virtual image (known as "swimming effect") as the viewer's head moves (or gazes) about in the HUD system eye-box Ref [16]. Minimizing the swimming effect in binocular optical systems such as HUD is very important, as in extreme cases excessive swimming effect in the virtual image could lead to motion sickness, vertigos or nauseas. These adverse effects are caused by conflict between vestibular and oculo-motor aspects of the human visual and perception systems, Ref [16,17].

Another advantage of the split exit pupil method of the MHUD system 200 of this invention is that it achieves a substantially reduced swimming effect when compared to prior art HUD systems that use a single mirror with a larger optical aperture. The aberrations of the smaller optical aperture of the reflective concave mirrors 230 would typically be much smaller than the aberrations of the relatively larger optical aperture reflective mirrors used in prior art single mirror HUD systems. Since the swimming effect is directly proportional with the magnitude of the optical distortion (or ray direction deviation) caused by the aberrations arising from the HUD reflective mirror, the multiplicity of smaller optical aperture concave mirrors 230 of the MHUD system 200 of this invention would tend to achieve a substantially smaller swimming effect when compared with prior art HUD systems. In addition, the angular overlap between the eye-box segments 255 of the MHUD modules 215 (explained in more detail in the discussion of FIG. 8) would typically cause the perception of any point in the virtual image 260 to incorporate optical contributions from the multiple MHUD modules 215. As a result, the optical distortions (or ray direction deviation) caused by the aberrations of the individual concave mirrors 230 of the multiple MHUD modules 215 would tend to be averaged at any point in the virtual image 260, consequently causing a reduction in the overall swimming effect perceived by the viewer of the MHUD system 200.

In another embodiment of this invention the imagers 220 of the MHUD assembly 210 would have a resolution that is higher than what the human visual system (HVS) can resolve, with the added resolution being dedicated to a digital image warping pre-compensation of the residual optical distortion caused by the aberrations arising from the concave mirrors 230. In a typical HUD viewing experience the virtual image would be formed at a distance of approximately 2.5 m. The lateral acuity of the HVS is approximately 200 micro radians. At that distance the HVS can resolve roughly 2500×0.0002=0.5 mm pixel, which is equivalent to approximately 450×250 pixel resolution for a virtual image 260 having 10" diagonal. The QPI imagers 220 used in the MHUD assembly 210 can provide a much higher resolution than this limit, for example 640×360 resolution or even 1280×720 with the same size optical aperture. The QPI imagers 220 providing a higher resolution with the same size optical aperture enables the use of concave mirrors 230 with the same size optical aperture, thus maintaining the volumetric advantage of the MHUD assembly 200. The added resolution of QPI imagers 220 allows the use of digital image warping pre-compensation that virtually eliminates the optical distortion arising from the concave mirrors 230 aberration and the resultant swimming effect while maintaining the maximum achievable resolution at the virtual image 260 and the same volumetric advantages.

Each of the reflective concave mirrors 230 can be either aspheric or free-form whereby the aspherical or free-form factor of the concave mirror is selected to minimize the optical aberrations of the concave mirror 230, and if necessary, the curvature of the windshield. It should be noted that the position of each of the QPI imagers 220 is axially symmetric relative to their associated concave mirror 230 to ensure balanced (somewhat equal) aberration at adjacent edges of any two of the concave mirrors 230. This is an important design aspect of the MHUD system 200 of this invention because it ensures uniform viewing transition of the virtual image 260 between the multiple eye-box segments 255 of the collective eye-box 250 of the MHUD system 200.

Figure 6:
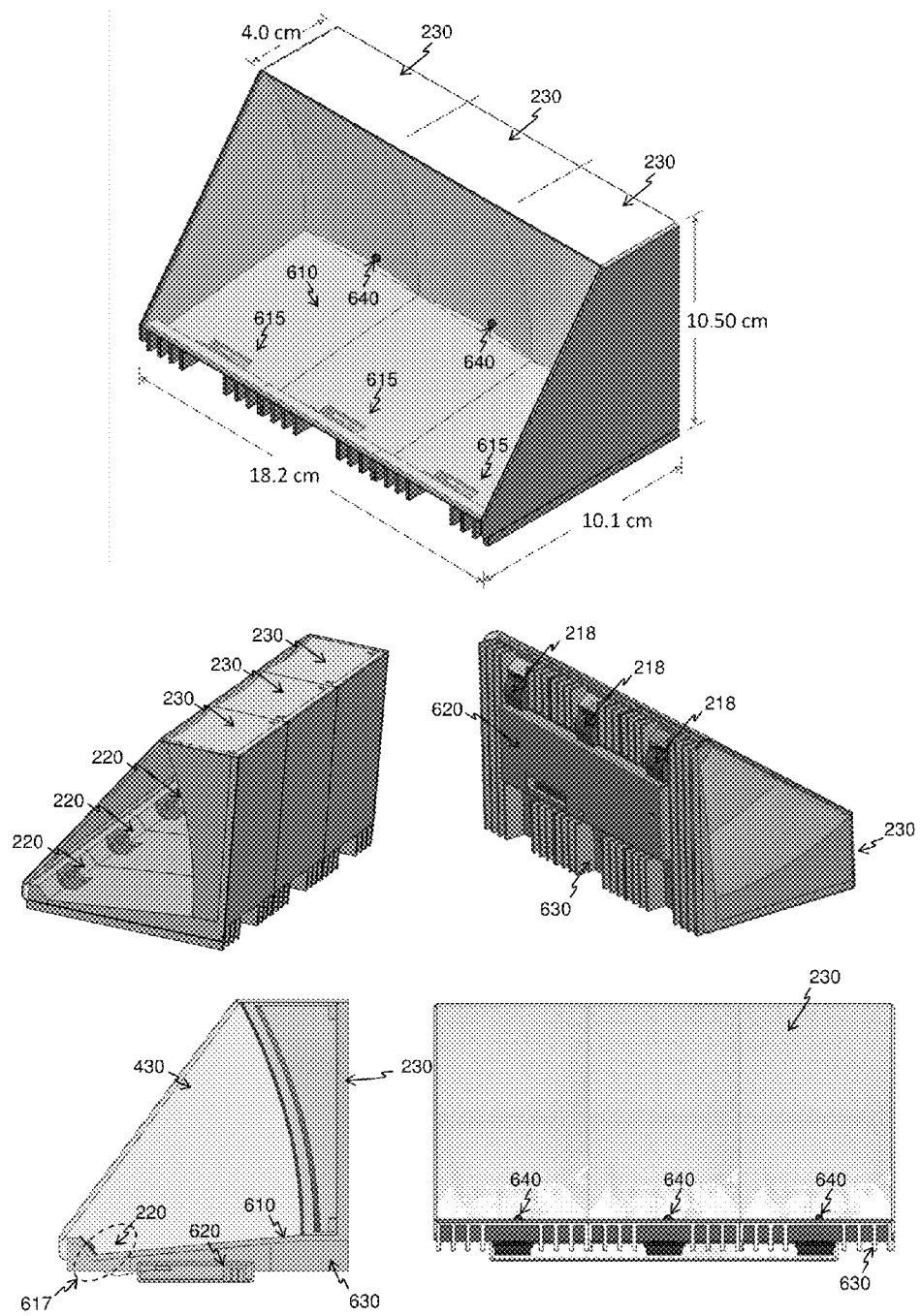
FIG. 6 illustrates a multi view perspective of the MHUD assembly design example of the MHUD system of the embodiment of FIG. 2.

FIG. 6 illustrates a multi view perspective of the MHUD assembly 210. As illustrated in FIG. 6, the MHUD assembly 210 is comprised of three reflective concave mirrors 230 assembled together within the enclosure 600. The three concave mirrors 230 can be either fabricated separately then fitted together within the enclosure 600 or can be fabricated as a single part then fitted within the enclosure 600. The three concave mirrors 230, whether assembled separately or as a single optical part, would be fabricated using embossed polycarbonate plastic with the optical surface being subsequently coated with a thin layer of reflective metal, such as silver or aluminum, using sputter techniques. As illustrated in FIG. 6, the back sidewall of the enclosure is comprised of three separate sections 610, each incorporating an optical window 615 which, when the back sidewall sections 610 are assembled together each with its respective concave mirror 230, would be aligned with the optical axis of their respective concave mirror 230. As illustrated in the side view perspective of FIG. 6, the top edge 617 of each of the back sidewall sections 610 is angled toward the concave mirror 230 to allow the imagers 220, which would be mounted on the angled edge surface 617 of the back sidewall sections 610, to be aligned with the optical axis of their respective concave mirror 230.

As illustrated in the rear side view perspective of FIG. 6, the back sidewall sections 610 would be assembled together on one side of the back plate 630 with the control and interface electronics (printed circuit board) 620 of the MHUD assembly 210 mounted on the opposite side of the back plate 630. In addition, the back plate 630 also incorporates thermal cooling fins to dissipate the heat generated by the imagers 220 and the interface electronics element 620 of the MHUD assembly 210. As illustrated in the rear side view perspective of FIG. 6, each of the imagers 220 would typically be mounted on a flexible electrical board 618 that connects the imagers 220 to the control and interface electronics 620.

As illustrated in the rear side view perspective of FIG. 6, the centers of the interface edges of the each pair of the concave mirrors 230 and the back sidewall sections 610 incorporate the photo detectors (PD) 640, typically photo-diodes, each positioned and oriented to detect the light emitted from the imagers 220 onto their respective concave mirror 230. Typically three photo-diodes would be used in each module, one for each color of light emitted. The output of the photo detectors (PD) 640 is connected to the control and interface electronics 620 of the MHUD assembly 210 and is used as input to the uniformity control loop (described in the discussion below), implemented within the hardware and software design elements of the interface electronics element 620. Also provided to the control and interface electronics 620 of the MHUD assembly 210 as an input, is the output of the ambient light photo detector sensor 660, which is typically an integral part of most vehicles' dashboard brightness control.

Figure 7:
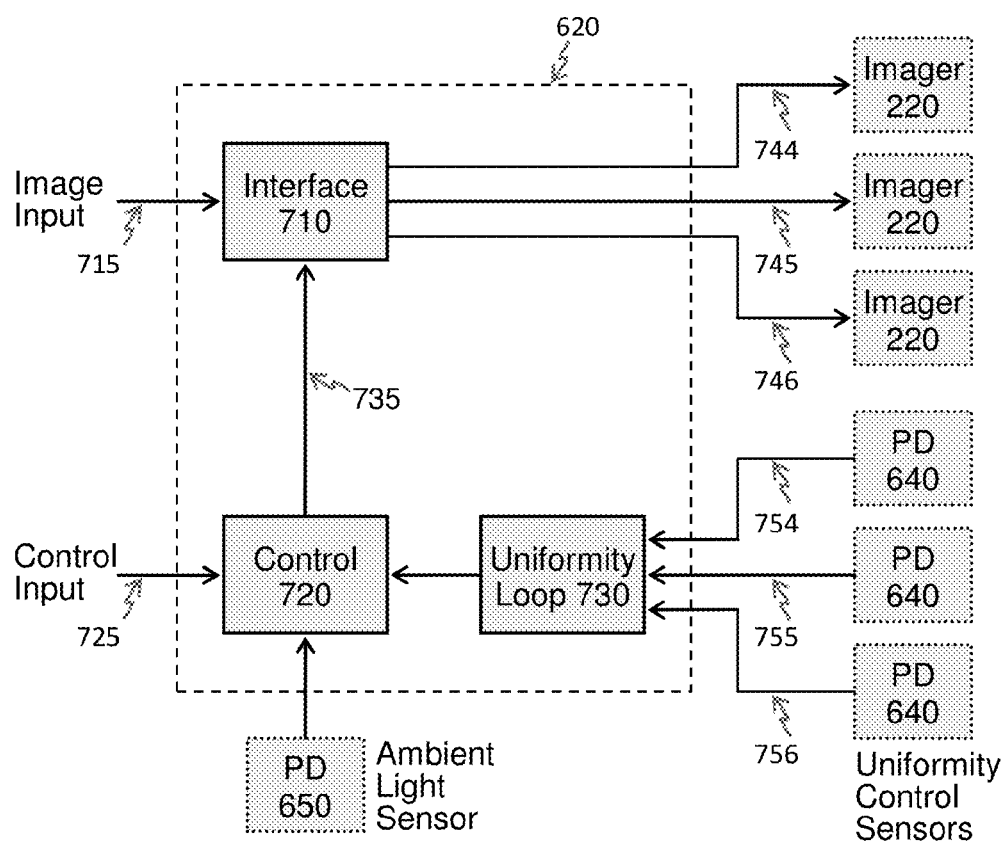
FIG. 7 illustrates a functional block diagram of the interface and control electronics design element (board) of the MHUD system of the embodiment of FIG. 2.

The control and interface electronics 620 of the MHUD assembly 210 incorporates the hardware and software design functional elements illustrated in the block diagram of FIG. 7, which include the MHUD interface function 710, the control function 720 and the uniformity loop function 730. The MHUD interface function 710 of the control and interface electronics 620 of the MHUD assembly 210, which is typically implemented in a combination of hardware and software, receives the image input 715 from the vehicle's Driver Assistance System (DAS) and incorporates into the image the color and brightness corrections 735 provided by the control function 720, then provides image inputs 744, 745 and 746 to the imagers 220 of the MHUD assembly 210. Although the same image input 715 data would be provided to the three imagers 220 of the MHUD assembly 210, the MHUD interface function 710 incorporates each imager 220 specific color and brightness corrections in their respective image inputs 744, 745 and 746 based on the color and brightness corrections 735 received from the control function 720.

In order to ensure color and brightness uniformity across the multiple segments 255 of the collective eye-box 250, the uniformity loop function 730 of the control and interface electronics 620 receives the input signals 754, 755 and 756 from the photo detectors (PD) 640 of each of the modules 215 of the MHUD assembly 210, computes the color and brightness associated with each of the modules 215 of the MHUD assembly 210 then calculates the color and brightness corrections required to make the color and brightness become more uniform across the multiple segments 255 of the collective eye-box 250. This would be accomplished with the aide of an initial calibration look-up table that would be performed and stored in the memory of the control and interface electronics 620 when the MHUD assembly 210 is originally assembled. The color and brightness corrections calculated by the uniformity loop function 730 are then provided to the control function 720 which combines these corrections with input received from the ambient light sensor 650 and the external color and brightness adjustment input command 725 to generate the color and brightness corrections 735 which then are incorporated into the image data by the MHUD interface function 710 before the corrected image data is provided as the image inputs 744, 745 and 746 to the imagers 220. In incorporating the input received from the ambient light sensor 650 into the color and brightness corrections, the control function 720 would adjust the brightness of the virtual image of the heads-up display in proportion with or in relation to the vehicle external light brightness. Note that image data as used herein means image information in any form whatsoever, whether as received as an input to the heads-up display, as provided to the imagers or as in any other form.

As explained previously, one embodiment of the MHUD system 200 uses imagers 220 with higher resolution than the maximum HVS resolvable resolution at the virtual image 260 and incorporates means to eliminate or substantially reduce optical distortion and the swimming effect it causes by digitally warping the image input to the imagers 220. The MHUD interface function 710 of the MHUD assembly 210 of the MHUD system 200 of that embodiment would also incorporate a multiplicity of look up tables each incorporating data that identifies the digital image warping parameters required to pre-compensate for the residual optical distortion of each of the concave mirrors 230. These parameters are used by the MHUD interface function 710 to warp the digital image input of each of the imagers 220 in such a way that the image data input to each of the imagers 220 pre-compensates for their corresponding concave mirror 230 residual distortion. The digital image warping parameters incorporated in the look up tables of the MHUD interface function 710 would be preliminarily generated from the optical design simulation of the MHUD assembly 210, then augmented with optical test data that is based on measurements of the residual optical distortion of each module 215 after the digital image warping pre-compensation is applied by the MHUD interface function 710. The resultant digitally warped image data is then combined with the color and brightness corrections 735 provided by the control function 720, then the color and brightness corrected and distortion pre-compensated image data is provided as the image inputs 744, 745 and 746 to the imagers 220 of the MHUD assembly 210. With this design method of the MHUD system 200 the residual optical distortion caused by the concave mirrors 230 and its resultant swimming effect would be substantially reduced or eliminated altogether, thus making it possible to realize a distortion-free MHUD system 200.

As illustrated in the perspective view of FIG. 6, the top side of the MHUD assembly 210 is a glass cover 430, which would function as the optical interface window of the MHUD assembly 210 at the top surface of the vehicle dashboard and would also function as a filter that would attenuate the sunlight infrared emission to prevent sunlight thermal loading at the imagers 220. The glass used should be selected to also be substantially transparent to the wave lengths of the light of interest.

The design method of the MHUD assembly 210 leverages the characteristics of the human visual system (HVS) to simplify the design implementation and assembly tolerances of the MHUD assembly 210. First, the eye pupil being approximately 5 mm in diameter (3-5 mm in daytime and 4-9 mm in night time) and resultant lateral acuity in viewing the virtual image 260 would allow an indiscernibly small gap between the MHUD assembly 210 concave mirrors 230 that can reach as much as 1 mm in width. Second, the eye angular difference accommodation limit of approximately 0.5 degree would allow a small angular tilt between the MHUD assembly 210 concave mirrors 230 that can reach approximately 0.15 degree. These tilt and gap allowances set forth a remarkably relaxed mechanical alignment tolerance requirement for the MHUD assembly 210 concave mirrors 230 and therefore enable a very cost effective manufacturing and assembly approach for the MHUD assembly 210. Any further tilt and/or alignment requirements man be easily accommodated, normally in software.

Figure 8:
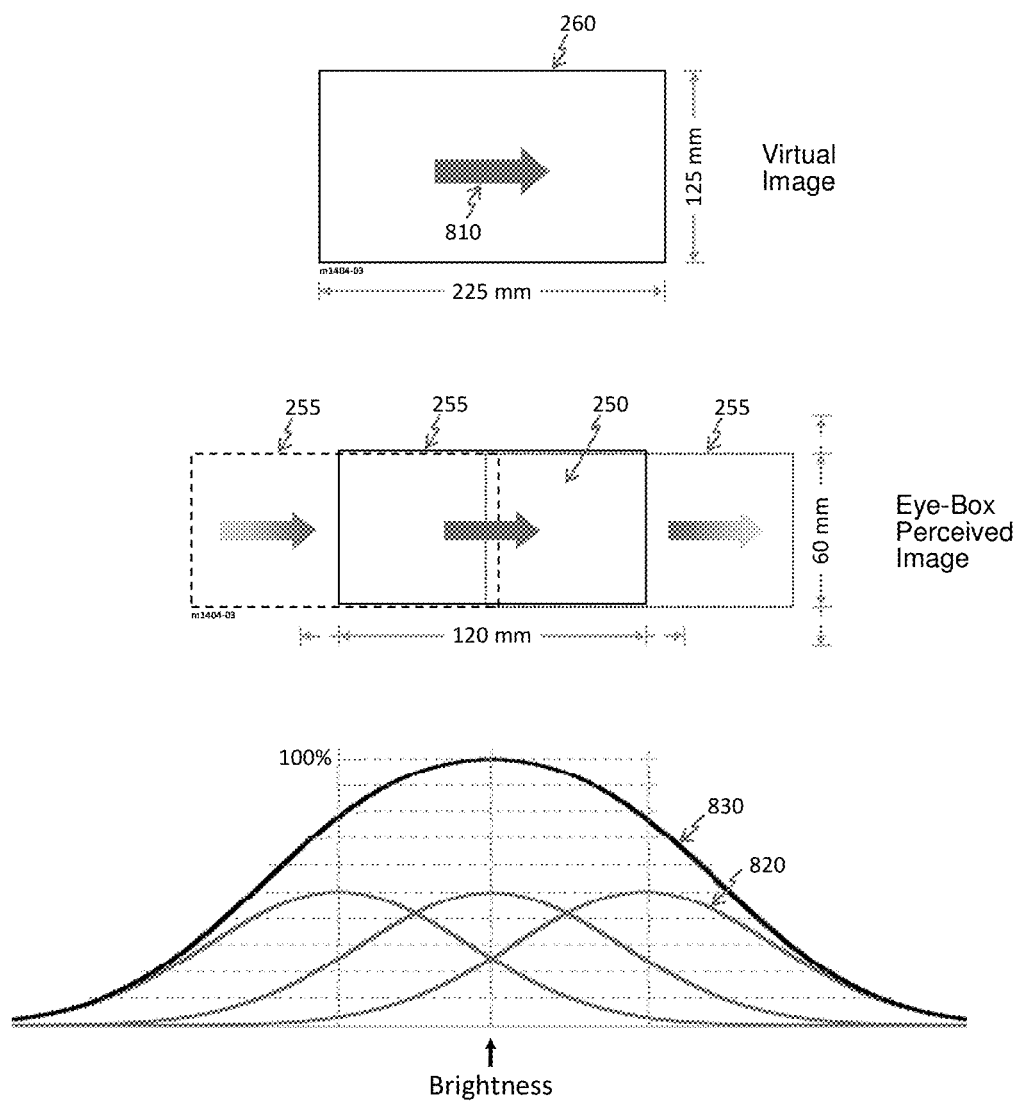
FIG. 8 illustrates the novel split eye-box design method of the MHUD system 200 of the embodiment of FIG. 2.

FIG. 8 illustrates the novel split eye-box design method of the MHUD system 200 of this invention. The illustration of FIG. 8 is meant to show the relationship between collective eye-box 250 and the virtual image 260 of the MHUD system 200. FIG. 8 also illustrates an example object 810, the arrow shown on the virtual image 260, displayed by the MHUD system 200. In the design of the MHUD system 200, each of the eye-box segments 255 would typically be positioned at the exit pupil of its respective module 215. As a result the image information presented to the viewer's eyes within each of the eye-box segments 255 would be in the angular space. Thus the virtual image 260 arrow object 810 presented to the viewer within each of the eye-box segments 255 separately would typically be fully visible to the viewer when the viewer's head is positioned within the central region of the respective eye-box segment 255, but the tip or tail ends of the arrow object 810 of the virtual image 260 would gradually vignette (or fade away) when the viewer's head is moved to the right side or left side of the eye-box segment 255, respectively. In the design of the MHUD system 200 when the modules 215 are integrated together into the MHUD assembly 210, shown in the perspective illustration of FIG. 6, the eye-box segments 255 of the modules 215 would be made to overlap, as illustrated in FIG. 8, to produce the collective eye-box 250 of the MHUD system 200. Thus the collective eye-box 250 of the MHUD system 200 is formed by the overlap of the exit pupil areas forming the eye-box segments 255 of the multiplicity of modules 215, thus making the image information presented to the viewer's eyes within the collective eye-box 250 be an angularly multiplexed view of the virtual image 260 extending over the combined angular field of view of the MHUD modules 215. As illustrated in FIG. 8, the arrow object 810 of the virtual image 260 would become fully visible (or viewable) within the overlap area of the eye-box segments 255 defining the collective eye-box 250 of the MHUD system 200 with the arrow object 810 of the virtual image 260 gradually vignetting (or fading away) when the viewer's head is moved to the right side or left side of the peripheral regions of the collective eye-box 250, respectively.

The size of overlap between the eye-box segments 255 of the modules 215 is dependent upon their angular vignetting profiles, 820 in FIG. 8, and would determine the ultimate size of the collective eye-box 250 of the MHUD system 200. The latter is defined as the collective eye-box 250 area boundaries or dimensions within which the virtual image 260 is fully visible (or viewable) at the desired brightness uniformity. FIG. 8 also illustrates the resultant angular vignetting profile shield of the MHUD assembly 210 across the overall area of the overlapping eye-box segments 255 of the modules 215. As illustrated in FIG. 8, the brightness of the virtual image 260 that would be perceived by the viewer would include brightness contributions of $\Lambda_R$, $\Lambda_C$, and $\Lambda_L$ (left, center and right) from each of the modules 215; respectively. The criterion for defining the boundaries of the collective eye-box 250 would be the area A of the overlap of the eye-box segments 255 within which the virtual image 260 brightness is uniform within a given threshold $\lambda$ (for example, less than 25%) across the selected region; i.e., $Var_A(\Lambda_R+\Lambda_C+\Lambda_L) \leq \lambda$, the desired uniformity threshold. With this criterion for defining the boundaries of the collective eye-box 250 and the overlap of the eye-box segments 255 of the modules 215 illustrated in FIG. 8, the perceived brightness across the virtual image 260 would typically include a contribution of at least 50% from one of the modules 215. Meaning that anywhere within the boundaries of the collective eye-box 250 defined by the stated criterion, each of the modules 215 would contribute at least 50% of the perceived brightness of the virtual image 260. With this design approach of the MHUD system 200 the desired brightness uniformity of the virtual image 260 would become the criterion that defines the size of the collective eye-box 250. This design criterion is illustrated in the FIG. 8 design example of using a uniformity threshold $\lambda=25\%$ to produce a 120 mm wide collective eye-box 250. As shown in the illustration of FIG. 8, when a uniformity threshold $\lambda=37.5\%$ is used, an approximately 25% wider collective eye-box 250 measuring approximately 150 mm would be defined.

As illustrated in FIG. 8, in eye-box segment areas extending beyond the right and left sides of the collective eye-box 250 of the MHUD system 200, the arrow object 810 of the virtual image would gradually vignette or fade away as the viewer's head moves into these regions; respectively. With the design approach of the MHUD system 200, the addition of a module 215 to either the right or left sides of the MHUD assembly 210, illustrated in FIG. 6, would extend the lateral width of the collective eye-box 250 of the MHUD system 200, as defined by the design criterion defined earlier, to the right or left sides; respectively, where the arrow object 810 of the virtual image 260 would become fully visible at a desired brightness uniformity. A similar effect of extending the height of the collective eye-box 250 would occur in the orthogonal direction when another row of modules 215 is added to the MHUD assembly 210. Thus with this modular design method of the MHUD system 200 of this invention, any arbitrary size collective eye-box 250 with any design selected width and height dimensions can be realized by adding more of the modules 215 into the MHUD assembly 210.

In essence the split exit pupil modular design method of the MHUD system 200 of this invention enables the use of a multiplicity of QPI imagers 220 and concave mirrors 230, each with relatively smaller apertures and each achieving a short optical track length to replace the much longer optical length of the larger image source and the single mirror used in prior art HUD systems. Thus the smaller apertures imagers 220 and concave mirrors 230 of the MHUD modules 210 collectively enable a substantially smaller volumetric aspect than can be achieved by prior art HUD systems that use a larger single image source and a single mirror to achieve the same size eye-box. Furthermore, the size of the achieved collective eye-box 250 of the MHUD system 200 can be tailored by using the appropriate number of modules 215 basic design elements. Conversely, the volumetric aspects of the MHUD system 200 can be made to match the volume available in the vehicle dashboard area while achieving a larger size collective eye-box 250 than would be achieved by a prior art HUD system that can fit in the same available volume.

Figure 9:
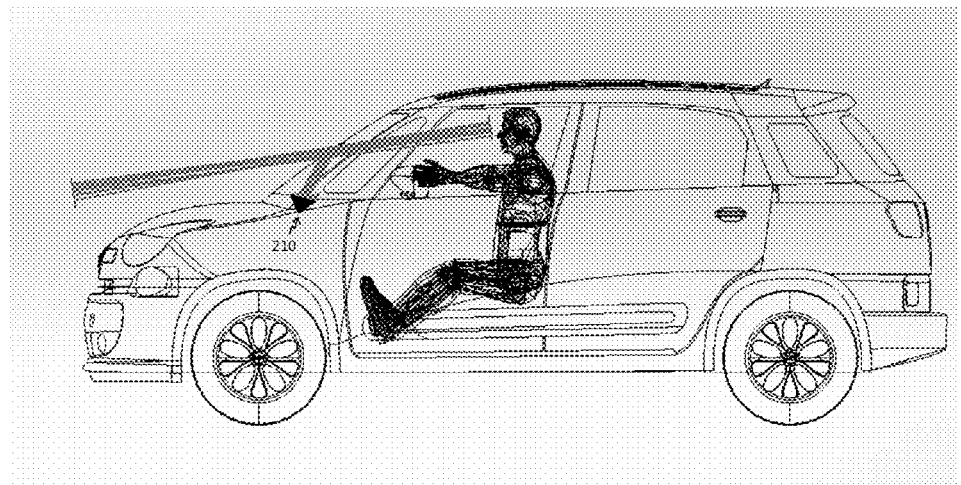
FIG. 9 illustrates the actual volume of the MHUD assembly design example illustrated in FIG. 6 installed in the dashboard of a sub-compact automobile.

In order to illustrate the volumetric advantages of the MHUD system 200 of this invention the perspective views of FIG. 6 shows the design dimension of an MHUD assembly 210 that uses three QPI imagers 220, each with an optical aperture size of 6.4×3.6 mm, and three concave mirrors, each with an optical aperture size of 60×100 mm, to achieve a 120×60 mm collective eye-box 250 size based on the brightness uniformity threshold of λ=25%. Based on the design dimensions shown in FIG. 6, the total volume of the MHUD assembly 210 would be approximately 1350 cc (1.35 liter). For comparison purposes, the total volume of a prior art HUD system that uses a single larger aperture mirror and a single larger image source to achieve the same eye-box size would be in excess 5000 cc (5 liter). Thus the design method of the MHUD system 200 of this invention would enable a HUD system that is a factor of 3.7× more volumetrically efficient (or smaller) than prior art HUD systems. In order to visualize this volumetric advantage, FIG. 9 illustrates the volume of the MHUD assembly 210 design example illustrated in FIG. 6 installed in the dashboard of a sub-compact automobile. As illustrated in FIG. 9, the volumetrically efficient design of the MHUD system 200 of this invention enables the addition of HUD capabilities in an automobile with very constrained dashboard volume in which prior art HUD systems would simply not fit.

Figure 10:
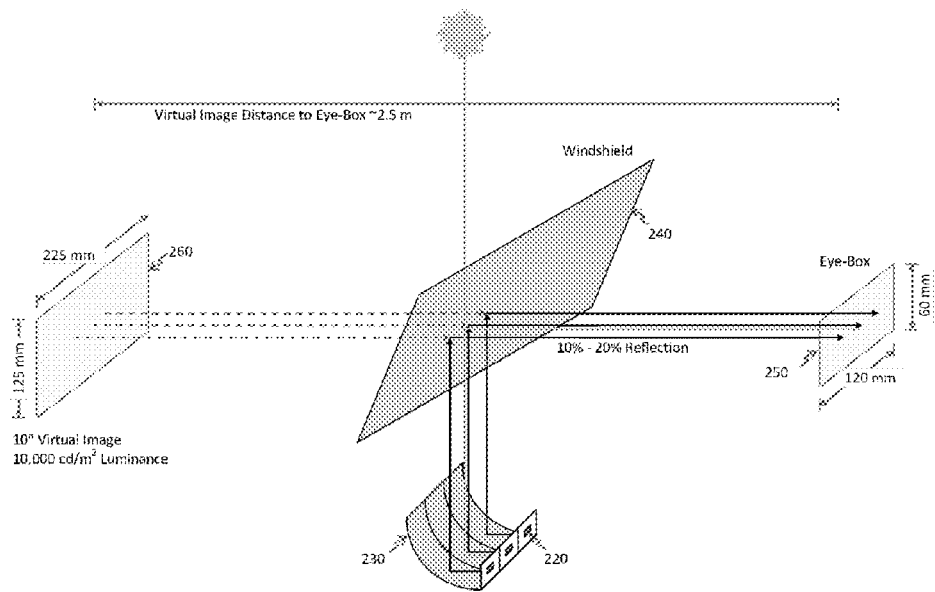
FIG. 10 illustrates the ray path of the MHUD system 200 of this invention including the sunlight loading.

FIG. 10 illustrates the ray path of the MHUD system 200. As illustrated in FIG. 10, and previously explained and illustrated in FIG. 2, the three QPI imagers 220 comprising the MHUD assembly 210 would each generate the same image at the same resolution (for example 640×360 pixels) with the three images, and after being reflected by their three respective concave mirrors 230, would angularly address the entire 120×60 mm collective eye-box 250 of the earlier described design example and would collectively provide 640×360 spatial resolution across the 125×225 mm virtual image 260 of the earlier described design example. FIG. 10 illustrates a design requirement to generate 10,000 cd/m2 of brightness at the virtual image 260. With a typical windshield reflectivity of approximately 20% and the collective eye-box 250 boundaries definition criterion explained earlier, each of the three QPI imagers 220 would generate approximately 25,000 cd/m2 of brightness. Conservatively estimated, the three QPI imagers 220 plus the control and interface electronics 620 of the MHUD assembly 210 would collectively consume approximately 2 W to generate 25,000 cd/m2 of brightness, which is approximately 25% of the power consumption of a prior art HUD system.

Referring to the MHUD system 200 performance illustrated in FIG. 5, the encircled energy plot of FIG. 5 shows the geometrical blur radius of the collimated light beam from the concave mirror 230 optical aperture of 180 micron in size. With each of the modules 215 design example illustrated in FIG. 6 having an effective focal length of 72 mm, the 180 micron blur size indicated in the encircled energy plot of FIG. 5 gives each of the modules 215 an angular spread of 0.143 deg for a light beam originating at a pixel of the imager 220 and collimated by its corresponding concave mirror 230. The swimming effect associated with an angular spread of 0.143 deg over the full beam width from a pixel while resolution (MTF) is decided by the effective beam width sampled by eye pupil size. The MTF plot of FIG. 5 shows the MTF of each of the modules 215 calculated for a typical eye pupil aperture of 4 mm diameter. The smaller this angular spread angle, the smaller the swimming radius at the virtual image 260. For a virtual image 260 viewed 2.5 m from the collective eye-box 250 of the MHUD system 200, the corresponding swimming radius for the MHUD system 200 design example would be 6.2 mm. A prior art HUD system that uses a single mirror and having an optical aperture size equal to the full aperture size of the MHUD assembly 210 design example would have an optical aperture that is approximately 2.4× larger than the optical aperture of the module 215. Since the aberration blur size is directly proportional to the aperture size raised to the third power Ref [18], the prior art single mirror HUD system having an optical aperture size equal to the full aperture size of the MHUD assembly 210 design example would have a corresponding swimming radius approximately 14.3 mm if the $5^{th}$ order aberration happens to compensate for the large $3^{rd}$ order aberration, which cannot be achieved purposefully by design, otherwise the prior art single mirror HUD system would typically have a corresponding swimming radius of approximately 39.7 mm, which is 6.2× larger than the swimming radius achieved by the design example of the MHUD system 200. It should also be mentioned that with the aberration pre-compensation method described earlier, the MHUD system 200 swimming radius can be substantially reduced below the stated values of this design example or even eliminated altogether.

FIG. 10 also illustrates the ray path of the MHUD system 200 with the sunlight loading included. As illustrated in FIG. 10, the reverse optical path of the sunlight that strikes the windshield of the vehicle would reach the collective eye-box 250 area possibly causing a glare in the virtual image 260. In the design of the MHUD system 200 of this invention the amount of sunlight rays that could reach the collective eye-box 250 will be much less in comparison to prior art HUD systems. First, in assuming that the windshield 240 optical transmission is 80%, the light rays from the sun will be attenuated by the windshield 240 to at most 80% of its brightness. Second, the sun rays transmitted through the windshield 240 and reflected by one of the concave mirrors 230 toward its corresponding imager 220 would be further attenuated by the anti-reflective (AR) coating on the optical aperture of the imager 220 to at most 5% of its brightness before it is reflected back toward the concave mirrors 230 assembly. Third, this reverse path sunlight would then be further attenuated to at most by 20% of its brightness when it is reflected by windshield 240 toward the collective eye-box 250. Since, as explained earlier, the imager 220 and concave mirror 230 of each of the modules 215 contributes at most 50% to the brightness of the virtual image 260, the sunlight glare reflected from the modules 215 stricken by the sunlight would appear further attenuated by 50% at the virtual image 260. Therefore, based on this path attenuation analysis, the sunlight that would reach the collective eye-box 250 would be attenuated to at most to 0.4% (much less than 1%) of its brightness. With the MHUD system 200 being able to generate more than 10,000 cd/m2 of brightness and 0.4% sunlight glare at the virtual image 260, the MHUD system 200 can tolerate a sunlight brightness of more than 250,000 cd/m2, which is equivalent to a unified glare rating (UGR) (or glare to image intensity ratio) of approximately 28 dB. It is worth mentioning that the glass cover 430 would be infrared absorbing, but transparent to light of the wavelengths used in the heads-up display of the present invention to prevent the sun loading heat from being concentrated by the concave mirror 230 assembly back to the imagers 220.

In the embodiments described above, multiple modules were disposed side by side to provide overlapping eye-box segments to provide a wider collective eye-box 250 than the eye-box segments 255 themselves. However, if desired, instead or in addition, the modules may be disposed so that the eye-box segments of modules 215 are also stacked to provide a taller collective eye-box 250, again all modules displaying the same virtual image at the same position in front of the vehicle. Note that the stacking to provide a taller collective eye-box 250 is in general not a stacking of modules, but rather because of the slope of the typical windshield, the stacking of the eye-box segments may be accomplished by simply using a larger, substantially horizontal area of the dashboard for the additional modules. Also while it was previously stated that "As illustrated in FIG. 2, the image emitted from each single imager with associated optics 220 is collimated, magnified and reflected by its associated concave mirror 230, then partially reflected off the vehicle windshield 240 to form the virtual image 260 which is viewable within the eye-box segment 255 located at the nominal head position of the vehicle's driver (operator)", in any embodiment, the extent of collimation achieved by the concave mirror will necessarily be less than perfect, and may be intentionally set to limit how far ahead of the vehicle the virtual image will be formed. In some instances, the concave mirrors may in fact be purposely designed to distort the collimation to offset any following sources of aberrations, the curvature of a windshield, if any, being the most obvious example.

It was previously indicated that the off-axis distortion and tilting aberrations and color and brightness corrections can be made in the control and interface electronics 620 of the MHUD assembly 210 of FIG. 2 (see also FIG. 6). Of course lateral position correction of each image or image segment from each module 215 may also be made in the control and interface electronics 620 (or mechanically) so that double images or double image portions are not displayed. Further, it should be noted that "brightness corrections" have at least two primary aspects. The first and most obvious is the correction of brightness variations, module to module, so that an image brightness (and color) from different modules will not be different. Associated with that however, is the fact that image warping and other factors could possibly cause a variation in brightness of image portions within an individual module, in that it is possible that changes in pixel spacing due to warping could give rise to a visible brightness aberration. If this is encountered, since the brightness of each individual pixel in each module is individually controllable, if necessary pixel brightness may be locally increased in areas where pixel separation is increased, and decreased in areas where pixel separation is decreased. Finally, it should be noted that a typical solid state emissive pixel array imager is not a square imager, but is typically a rectangle of unequal dimensions. Consequently the selection of imager orientation may also provide an additional variable that can be useful in the design of a heads-up display of the present invention.

Table 1 below presents the salient performance characteristics of the QPI imager based MHUD system 200 of certain embodiments of the invention illustrating their performance advantages in comparison to prior art HUD system that uses a single larger mirror and a single larger image source. As shown in Table 1, the split exit pupil MHUD system of this invention out performs prior art HUD systems by multiple factors in every performance category. In addition, because of its relaxed manufacturing tolerance and smaller size mirror, explained earlier, the MHUD systems 200 of this invention are expected to be much more cost effective than prior art with comparable eye-box size.

TABLE 1

Performance Comparison

| Parameter | Prior Art HUD* | QPI Imager Based MHUD |
|---|---|---|
| Color Reproduction (Ratio of NTSC) | 80% | 140% Programmable |
| Virtual Image Intensity | 6,000 cd/m$^2$ | >10,000 cd/m$^2$ |
| Contrast Ratio | 400:1 | >100,000:1 |
| Power Consumption (Imager + Drive Electronics) | >8 W | <2 W |
| Relative Size (HUD Assembly) | 100% | <25% |
| Aberration Induced Swimming Effect | 100% | <16% |

*Prior Art HUD based on using a high brightness LCD panel as image source

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:
1. A heads-up display for a vehicle comprising:
a multiplicity of modules, each said module having;
a solid state emissive pixel array imager; and
a concave mirror disposed to collimate, magnify and reflect an image generated by the solid state emissive pixel array imager toward a vehicle windshield to form a virtual image that is viewable within an eye-box segment;

the multiplicity of modules being disposed so that the eye-box segments combine to provide the heads-up display having a collective eye-box that is larger than the eye-box segment of each module, the collective eye-box being located at a nominal head position of a vehicle's driver;

each module being configured and positioned to form the respective virtual image at the same position from the vehicle windshield and each module with its respective eye-box segment being positioned at an exit pupil of the respective module such that adjacent eye-box segments of the multiplicity of modules overlap and combine to form a split exit pupil eye-box, whereby image information presented to the vehicle's driver within the collective eye-box is an angularly multiplexed view of the virtual image extending over a collective angular field of view.

2. The heads-up display of claim 1 wherein the overlap of the eye-box segments of the multiplicity of modules forms a split exit pupil collective eye-box.

3. The heads-up display of claim 1 wherein the size of the eye-box segments of each module and the number of modules in the heads-up display are selected to provide a collective eye-box size to accommodate a range of driver head positions.

4. The heads-up display of claim 1 wherein the split exit pupil eye-box of the heads-up display enables a heads-up display with tailorable size eye-box and volumetric aspects to match a wide range of vehicles' requirements while using the same heads-up display modules.

5. The heads-up display of claim 1 wherein the collective eye-box has a size that is extendable in width and/or in height by incorporating one or more additional modules.

6. The heads-up display of claim 1 wherein boundaries of the collective eye-box are areas of the overlap of eye-box segments within which the brightness of the virtual image is uniform within a given threshold across the collective eye-box.

7. The heads-up display of claim 6 wherein:
the overlap between the eye-box segments cause the driver's perception of any point in the virtual image to incorporate optical contributions from more than one of the multiplicity of modules, thereby causing optical distortions or ray direction deviations induced by aberrations of individual concave mirrors of the multiplicity of modules to be averaged at any point in the virtual image, reducing any swimming effect perceived by the driver.

8. The heads-up display of claim 1 wherein the concave mirrors have either aspheric or free-form reflective surfaces whereby the aspherical or free-form factor of the reflective surfaces are selected to minimize their optical aberrations.

9. The heads-up display of claim 8 wherein the solid state emissive pixel array imagers each include associated optics that balance off-axis distortion and tilting aberrations arising from the respective concave mirror, wherein the associated optics is either a separate lens optical element or is attached directly onto the respective solid state emissive pixel array imagers.

10. The heads-up display of claim 9 wherein:
the aberrations realized by an aperture size of each of the multiplicity of concave mirrors, the aspherical or free-form factors of the concave mirrors and the off-axis distortion and tilting aberrations balancing effects of the solid state emissive pixel array imager associated optics collectively minimize optical distortion caused by the concave mirrors, thereby minimizing any swimming effect associated with the heads-up display.

11. The heads-up display of claim 1 wherein each module provides an optical aperture size and a pixel resolution that provides a higher resolution than a human visual system can resolve at the virtual image position, the additional resolution being dedicated to digital image warping to pre-compensate for residual optical distortion caused by aberrations arising from the concave mirrors, thereby reducing any swimming effect perceived by the driver of the heads-up display.

12. The heads-up display of claim 1 wherein a volumetric size of the heads-up display is caused to match the volume available in a vehicle dashboard area by selecting a number of the modules comprising the heads-up display.

13. The heads-up display of claim 1 further comprising:
an assembly having;
the multiplicity of modules;
a multiplicity of photo detectors; and
a controller;
the multiplicity of photo detectors each being positioned within the assembly to detect light emitted from the solid state emissive pixel array imager of a respective one of the modules;
the controller being coupled to a source of image data for the virtual image to be displayed, to outputs of the photo detectors and to inputs to the solid state emissive pixel array imagers, the controller implementing control functions in electronic hardware and/or software responsive to the outputs of the photo detectors to control the solid state emissive pixel array imagers to ensure color and brightness uniformity across the multiple eye-box segments of the collective eye-box.

14. The heads-up display of claim 13 wherein the controller is further comprised of a connection for coupling to an output of an ambient light photo detector of a vehicle as used to control vehicle dashboard brightness.

15. The heads-up display of claim 13 wherein:
the source of image data is a Driver Assistance System, and the control functions implemented in electronic hardware and/or software in the controller include:
a uniformity loop function responsive to the outputs of the photo detectors to calculate respective color and brightness corrections and to couple the corrections to each of the respective multiple solid state emissive pixel array imagers required to provide color and brightness uniformity across the collective eye-box of the heads-up display;
a first control function that combines the color and brightness corrections calculated by the uniformity loop function with an input to be received from an ambient light photo detector sensor of a vehicle as used to control vehicle dashboard brightness and;
an interface function that receives the image data from the vehicle's Driver Assistance System, incorporates into the image data provided to each solid state emissive pixel array imager, specific color and brightness corrections provided by the control function, and
a second control function for controlling each of the multiple solid state emissive pixel array imagers by providing image data as corrected for the respective solid state emissive pixel array imager.

16. The heads-up display of claim 15 wherein;
the controller includes an external color and brightness connection for coupling to an external color and brightness adjustment input, and wherein the interface function further includes a capability to receive and incorporate an external color and brightness adjustment into the image data of each solid state emissive pixel array imager, specific color and brightness corrections provided by the control function; and
the second control function being configured to control the multiple solid state emissive pixel array imagers by providing image data as corrected for the respective solid state emissive pixel array imager and as adjusted in accordance with the external color and brightness adjustment.

17. The heads-up display of claim 15 wherein the interface function is further configured to perform digital image warping to pre-compensate for residual optical distortion caused by aberrations arising from the concave mirrors, thereby reducing the swimming effect perceived by the driver.

18. The heads-up display of claim 13 wherein the controller is further comprised of a connection for coupling to an output of an ambient light photo detector, the output of the ambient light photo detector being used by the controller to control brightness of the virtual image of the heads-up display by controlling the brightness of emissions of the multiple solid state emissive pixel array imagers in relation to ambient light brightness as detected by the ambient light photo detector.

19. The heads-up display of claim 13 further comprising a glass cover forming an optical interface window, the glass cover being selected to attenuate sunlight infrared emission to reduce or prevent sunlight thermal loading on each of the multiple solid state emissive pixel array imagers.

20. A heads-up display for a vehicle comprising:
a multiplicity of modules, each said module having;
  a solid state emissive pixel array imager; and
  a concave mirror having aspheric or free-form reflective surfaces disposed to collimate, magnify and reflect an image generated by the solid state emissive pixel array imager toward a vehicle windshield to form a virtual image that is viewable within an eye-box segment;
the multiplicity of modules being disposed to provide the heads-up display having a collective eye-box that is larger than the eye-box segment of each module, the collective eye-box being located at a nominal head position of a vehicle's driver;
each module being configured and positioned to form the respective virtual image at the same position from the vehicle windshield and each module with its respective eye-box segment positioned at an exit pupil of the respective module such that some eye-box segments of the multiplicity of modules overlap and combine to form a split exit pupil eye-box, whereby image information presented to the vehicle's driver within the collective eye-box is an angularly multiplexed view of the virtual image extending over a collective angular field of view.

21. The heads-up display of claim 20 wherein boundaries of the collective eye-box are areas of the overlap of the eye-box segments within which the brightness of the virtual image is uniform within a given threshold across the collective eye-box.

22. The heads-up display of claim 20 wherein the collective eye-box has a size that is extendable in width and/or in height by incorporating one or more additional modules.

23. The heads-up display of claim 20 wherein the solid state emissive pixel array imagers each include associated optics that balance off-axis distortion and tilting aberrations arising from the respective concave mirror, wherein the associated optics is either a separate lens optical element or is attached directly onto the respective solid state emissive pixel array imagers.

24. The heads-up display of claim 20 further comprising:
an assembly having;
the multiplicity of modules;
a multiplicity of photo detectors; and
a controller;
the multiplicity of photo detectors each being positioned within the assembly to detect light emitted from the solid state emissive pixel array imager of a respective one of the modules;
the controller being coupled to a source of image data for the virtual image to be displayed, to outputs of the photo detectors and to inputs to the solid state emissive pixel array imagers, the controller implementing control functions in electronic hardware and/or software responsive to the outputs of the photo detectors to control the solid state emissive pixel array imagers to ensure color and brightness uniformity across the multiple eye-box segments of the collective eye-box.

25. The heads-up display of claim 24 wherein the controller is further comprised of a connection for coupling to an output of an ambient light photo detector of a vehicle as used to control vehicle dashboard brightness.

26. The heads-up display of claim 24 wherein:
the source of image data is a Driver Assistance System, and the control functions implemented in electronic hardware and/or software in the controller include:
  a uniformity loop function responsive to the outputs of the photo detectors to calculate respective color and brightness corrections and to couple the corrections to each of the respective multiple solid state emissive pixel array imagers required to provide color and brightness uniformity across the collective eye-box of the heads-up display;
  a control function that combines the color and brightness corrections calculated by the uniformity loop function with an input to be received from an ambient light photo detector sensor of a vehicle as used to control vehicle dashboard brightness and;
  an interface function that receives the image data from the vehicle's Driver Assistance System, incorporates into the image data provided to each solid state emissive pixel array imager, specific color and brightness corrections provided by the control function, and
  a control function for controlling the multiple solid state emissive pixel array imagers by providing image data as corrected for the respective solid state emissive pixel array imager.

27. The heads-up display of claim 26 wherein;
the controller includes an external color and brightness connection for coupling to an external color and brightness adjustment input, and wherein the interface function further includes a capability to receive and incorporate an external color and brightness adjustment into the image data of each solid state emissive pixel array imager, specific color and brightness corrections provided by the control function; and the control function is configured to control the multiple solid state emissive pixel array imagers by providing image data as corrected for the respective solid state emissive pixel array imager and as adjusted in accordance with the external color and brightness adjustment.

28. The heads-up display of claim 26 wherein the interface function is further configured to perform digital image warping to pre-compensate for residual optical distortion caused by aberrations arising from the concave mirrors, thereby reducing the swimming effect perceived by the driver.

29. The heads-up display of claim 24 wherein the controller is further comprised of a connection for coupling to an output of an ambient light photo detector, the output of the ambient light photo detector being used by the controller to control brightness of the virtual image of the heads-up display by controlling the brightness of emissions of the multiple solid state emissive pixel array imagers in relation to ambient light brightness as detected by the ambient light photo detector.

30. The heads-up display of claim 24 further comprising a glass cover forming an optical interface window, the glass cover being selected to attenuate sunlight infrared emission to reduce or prevent sunlight thermal loading on each of the multiple solid state emissive pixel array imagers.

31. A method of forming a heads-up display for a vehicle comprising:
using a multiplicity of modules, and performing in each module, directing an image emitted by a solid state emissive pixel array imager in each module onto a respective concave mirror to collimate, magnify and reflect the image;
mounting the multiplicity of modules in a vehicle so that the image from the concave mirror in each module can reflect from a vehicle windshield toward a vehicle operator's eyes to appear as a respective virtual image at some position in front of the vehicle, the position of the virtual images being the same for all modules; and
causing the solid state emissive pixel array imager in each module to emit the same image at any one time;
whereby a collective eye-box viewable by an operator of the vehicle will be larger than an eye-box segment of any one module:
each module being positioned to form the respective virtual image with the respective eye-box segment positioned at an exit pupil of the respective module such that the eye-box segments of the multiplicity of modules overlap and combine to form a split exit pupil collective eye-box, whereby image information presented to the vehicle's operator within the collective eye-box is an angularly multiplexed view of the virtual image extending over a collective angular field of view, the overlap of the eye-box segments of the multiplicity of modules forms a split exit pupil collective eye-box.

32. The method of claim 31 wherein aberrations caused by offsets and tilting of the virtual images is compensated for electronically by corresponding adjustments in image data provided to, and the image emitted, by each solid state emissive pixel array imager.

33. The method of claim 31 wherein the concave mirrors are free-form reflective surfaces selected to minimize optical aberrations.

34. The method of claim 31 wherein the concave mirrors are free-form reflective surfaces selected to minimize optical aberrations, including the optical aberrations caused by a curved windshield.

35. The method of claim 31 further comprising providing optics associated with each solid state emissive pixel array imager that balance off-axis distortion and tilting aberrations arising from the respective concave mirror, the associated optics being either a separate lens optical element or being attached directly onto the respective solid state emissive pixel array imager.

36. The method of claim 31 wherein each solid state emissive pixel array imager is selected to provide a higher pixel resolution than a human visual system can resolve at the virtual image position, and using the additional resolution for digital image warping to pre-compensate for residual optical distortion caused by aberrations arising from the concave mirrors, thereby reducing any swimming effect perceived by the driver of the heads-up display.

37. The method of claim 31 further comprising:
providing a multiplicity of photo detectors and a controller;
positioning the photo detectors to detect light emitted from the solid state emissive pixel array imager of a respective one of the modules;
coupling the controller to a source of image data for the virtual image to be displayed, to outputs of the photo detectors and to inputs to the solid state emissive pixel array imagers;
implementing in the controller, control functions in electronic hardware and/or software responsive to the outputs of the photo detectors to control the solid state emissive pixel array imagers to ensure color and brightness uniformity across the multiple eye-box segments of the collective eye-box.

38. The method of claim 37 further comprising connecting the controller to an output of an ambient light photo detector of a vehicle as used to control vehicle dashboard brightness.

39. The method of claim 38 further comprising:
coupling the controller to a Driver Assistance System to provide image data to the controller, and the control functions implemented in electronic hardware and/or software in the controller include:
a uniformity loop function responsive to the outputs of the photo detectors to calculate respective color and brightness corrections and to couple the corrections to each of the respective multiple solid state emissive pixel array imagers required to provide color and brightness uniformity across the collective eye-box of the heads-up display;
a control function that combines the color and brightness corrections calculated by the uniformity loop function with an input to be received from an ambient light photo detector sensor of a vehicle as used to control vehicle dashboard brightness and;
an interface function that receives the image data from the vehicle's Driver Assistance System, incorporates into the image data of each solid state emissive pixel array imager, specific color and brightness corrections provided by the control function, and
a control function for controlling the multiple solid state emissive pixel array imagers by providing image data as corrected for the respective solid state emissive pixel array imager.

40. The method of claim 38 further comprising coupling an output of an ambient light photo detector to the controller and using its output to control brightness of the virtual image of the heads-up display by controlling the brightness of emissions of the multiple solid state emissive pixel array imagers in relation to ambient light brightness as detected by the ambient light photo detector.

41. The method of claim 38 further comprising a glass cover forming an optical interface window, the glass cover being selected to attenuate sunlight infrared emission to reduce or prevent sunlight thermal loading on each of the multiple solid state emissive pixel array imagers.

42. The method of claim 38 further comprising;
coupling the controller to an external color and brightness adjustment input, and further providing a capability to receive and incorporate an external color and brightness adjustment into the image data of each solid state emissive pixel array imager, specific color and brightness corrections provided by the control function; and
controlling the multiple solid state emissive pixel array imagers by providing image data as corrected for the respective solid state emissive pixel array imager and as adjusted in accordance with the external color and brightness adjustment.

43. The method of claim 42 wherein the controller is further configured to perform digital image warping to pre-compensate for residual optical distortion caused by aberrations arising from the concave mirrors, thereby reducing the swimming effect perceived by the driver.

* * * * *